US011661325B2

(12) United States Patent
Rekow et al.

(10) Patent No.: US 11,661,325 B2
(45) Date of Patent: May 30, 2023

(54) CONTROL ELEMENTS FOR MATERIALS HANDLING VEHICLES

(71) Applicant: Crown Equipment Corporation, New Bremen, OH (US)

(72) Inventors: Craig J. Rekow, Troy, OH (US); Paul D. Magee, Troy, OH (US); Michael P. Gallagher, Greenville, OH (US); Roger J. Quinlan, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 17/302,956

(22) Filed: May 17, 2021

(65) Prior Publication Data

US 2021/0269294 A1 Sep. 2, 2021

Related U.S. Application Data

(63) Continuation of application No. 15/423,713, filed on Feb. 3, 2017, now abandoned.

(Continued)

(51) Int. Cl.
*B66F 9/075* (2006.01)
*B66F 9/20* (2006.01)

(Continued)

(52) U.S. Cl.
CPC .............. *B66F 9/0759* (2013.01); *B66F 9/07* (2013.01); *B66F 9/20* (2013.01); *G05G 1/01* (2013.01);

(Continued)

(58) Field of Classification Search
CPC ........... B66F 9/0759; B66F 9/20; G05G 1/01; G05G 1/06; G05G 2009/04703; G05G 9/047

(Continued)

(56) References Cited

U.S. PATENT DOCUMENTS 4,043,220 A * 8/1977 Kolb ........................ G05G 1/06 74/543
4,051,860 A 10/1977 Dowd et al.

(Continued)

FOREIGN PATENT DOCUMENTS

CN 103991823 A 8/2014
CN 203855374 U 10/2014

(Continued)

OTHER PUBLICATIONS

Examination report No. 1 for standard patent application dated May 26, 2022; Australian Application No. 2022200163; IP Australia.

(Continued)

*Primary Examiner* — Joseph Brown

(74) *Attorney, Agent, or Firm* — Stevens & Showalter LLP

(57) ABSTRACT

A plurality of control elements extend from the base portion of a control module in a materials handling vehicle. The control elements are located adjacent to one another, wherein at least one of the control elements includes mounting structure that permits the control element to be selectively mounted to the base portion in at least first and second positions. The first position defines a first distance between the control element and an immediately adjacent control element and the second position defines a second distance between the control element and the immediately adjacent control element, the second distance being greater than the first.

19 Claims, 10 Drawing Sheets

Related U.S. Application Data

(60) Provisional application No. 62/291,968, filed on Feb. 5, 2016.

(51) Int. Cl.
*H01H 21/22* (2006.01)
*G05G 1/01* (2008.04)
*G05G 1/06* (2006.01)
*G05G 9/047* (2006.01)
*B66F 9/07* (2006.01)

(52) U.S. Cl.
CPC ............... *G05G 1/06* (2013.01); *G05G 9/047* (2013.01); *H01H 21/22* (2013.01)

(58) Field of Classification Search
USPC .................................... 74/510, 525; 180/334
See application file for complete search history.

(56) References Cited

U.S. PATENT DOCUMENTS 4,140,144 A 2/1979 Dowd et al.
4,140,200 A * 2/1979 Tucek ...................... G05G 9/04 180/332
4,411,582 A 10/1983 Nakada
4,471,848 A * 9/1984 Skytoen .................... B66F 9/20 296/73
4,558,609 A 12/1985 Kim
4,895,040 A 1/1990 Soederberg
5,056,983 A * 10/1991 Naruse ...................... B66F 9/20 74/491
5,138,756 A * 8/1992 Johnson ................ E02F 9/2004 137/289
5,211,078 A 5/1993 McCarthy et al.
5,515,345 A 5/1996 Barreira
5,553,992 A * 9/1996 Ashcroft ............... E02F 9/2004 74/471 XY
5,645,277 A 7/1997 Cheng
5,769,363 A * 6/1998 Griswold ................ B64C 13/04 74/553
5,886,686 A 3/1999 Chen
5,890,562 A 4/1999 Bartels et al.
6,140,593 A 10/2000 Bramesfeld et al.
6,163,326 A 12/2000 Klein et al.
6,349,616 B1 2/2002 Onodera et al.
6,360,627 B1 3/2002 Buckingham et al.
H2024 H * 6/2002 Kelley ............................ 74/491
6,446,747 B1 9/2002 Muller et al.
6,536,825 B2 3/2003 McAndrew et al.
6,557,586 B1 5/2003 Lockyer et al.
6,727,890 B2 4/2004 Andres et al.
6,765,502 B2 7/2004 Boldy et al.
6,811,491 B1 11/2004 Levenberg et al.
6,892,481 B2 5/2005 Yamamoto et al.
6,903,662 B2 6/2005 Rix et al.
6,971,194 B2 * 12/2005 McClelland .......... E02F 9/2004 180/326
7,000,497 B1 * 2/2006 Campbell ................ G05G 5/06 74/544
7,032,703 B2 4/2006 Wulfert et al.
7,157,651 B2 1/2007 Rix et al.
7,172,050 B2 2/2007 Amamiya
7,178,623 B2 2/2007 Ginzel et al.
7,209,123 B2 4/2007 Andres et al.
7,290,635 B2 11/2007 Bisick et al.
7,375,743 B2 5/2008 Millar et al.
7,389,845 B2 * 6/2008 Longueville ........... B60N 2/753 180/326
7,438,318 B2 10/2008 Sano
7,484,587 B2 2/2009 Portscheller et al.
7,635,045 B2 12/2009 Shearer et al.
7,641,021 B2 1/2010 Behncke et al.
7,712,571 B2 5/2010 Proud et al.
7,758,424 B2 7/2010 Riggs et al.
7,971,677 B2 7/2011 Ekren et al.
8,167,080 B2 5/2012 Ruhter et al.
8,206,220 B2 6/2012 Young et al.
8,261,629 B2 9/2012 Bamabo et al.
8,493,325 B2 7/2013 See et al.
8,523,675 B2 9/2013 Young et al.
8,596,722 B2 12/2013 Haubrich et al.
8,754,853 B2 6/2014 Helton
9,506,556 B1 11/2016 Fredrick
10,415,694 B1 * 9/2019 Fredrick ............. F16H 59/0278
2002/0000975 A1 1/2002 Perkins et al.
2005/0021190 A1 1/2005 Worrell et al.
2006/0021819 A1 * 2/2006 Shearer ................. E02F 9/2004 180/321
2006/0037790 A1 2/2006 Haack et al.
2006/0042857 A1 3/2006 Catton et al.
2006/0125596 A1 6/2006 Darr et al.
2007/0273207 A1 11/2007 Dorn et al.
2008/0001435 A1 1/2008 Kraimer
2009/0090208 A1 * 4/2009 Diccion ............. G05G 9/04788 74/471 XY
2009/0223736 A1 * 9/2009 Ruhter .................. E02F 9/2004 180/336
2014/0372124 A1 12/2014 Thizon
2015/0033899 A1 2/2015 Geilsdorf et al.
2015/0198238 A1 7/2015 Smith et al.
2015/0360593 A1 12/2015 Mahler et al.
2016/0053779 A1 2/2016 Komatsu et al.
2017/0225930 A1 8/2017 Gallagher et al.

FOREIGN PATENT DOCUMENTS

DE 3106226 A1 9/1982
DE 9204392 U1 5/1992
DE 29518604 U1 2/1996
DE 19711299 A1 9/1998
DE 19932311 C1 9/2000
DE 10044738 A1 6/2002
DE 102005023890 A1 12/2005
DE 102004052757 A1 5/2006
DE 202006004965 U1 6/2006
DE 102005049098 A1 4/2007
DE 102006018537 A1 11/2007
DE 202010004737 U1 7/2010
DE 202010005869 U1 8/2010
DE 102010015639 A1 10/2011
EP 0454908 A2 11/1991
EP 1350669 A2 10/2003
EP 1747964 A2 1/2007
EP 1353257 B1 9/2007
EP 1633595 B1 3/2008
EP 1288063 B1 1/2009
EP 2131261 A2 12/2009
EP 2163452 B1 8/2010
EP 1824358 B1 11/2010
EP 2189328 B 3/2012
EP 2272788 B1 3/2012
EP 2676849 A2 12/2013
EP 2265462 B1 4/2014
EP 2832583 A2 2/2015
EP 2277736 B1 3/2015
EP 2308752 B1 12/2015
EP 2965937 A1 1/2016
EP 2987672 A1 2/2016
EP 3023296 A1 5/2016
EP 3023297 A1 5/2016
FR 2482741 A1 11/1981
FR 2790231 B1 5/2001
GB 2148219 A 5/1985
GB 2387427 B 12/2005
JP 2006306236 A 11/2006
JP 2007092284 A 4/2007
KR 20080060509 A 7/2008
WO 9836911 A1 8/1998
WO 9942327 A2 8/1999
WO 2005025919 A1 3/2005

(56) References Cited

FOREIGN PATENT DOCUMENTS

| | | |
|---|---|---|
| WO | 2010028043 A2 | 3/2010 |
| WO | 2011042746 A1 | 4/2011 |

OTHER PUBLICATIONS

Appelen, Annik; International Search Report and Written Opinion of the International Searching Authority; International Application No. PCT/US2017/016404; May 9, 2017; European Patent Office.
Xiaofan Tang; International Preliminary Report on Patentability; International Application No. PCT/US2017/016404; Aug. 16, 2018; International Bureau of WIPO; Geneva, Switzerland.
Verheul, Omiros; Communication pursuant to Article 94(3) EPC dated Jul. 14, 2020; European Application No. 17706343.5; European Patent Office; Rijswijk, Netherlands.
First Search dated May 8, 2019; Chinese Application No. 201780005177.2; The State Intellectual Property Office of the People's Republic of China.
Notification of the First Office Action dated May 17, 2019; Chinese Application No. 201780001577.2; The State Intellectual Property Office of the People's Republic of China.
Notification of the Second Office Action dated Nov. 18, 2019; Chinese Application No. 201780001577.2; The State Intellectual Property Office of the People's Republic of China.
Notification of the Third Office Action dated Jul. 2, 2020; Chinese Application No. 201780001577.2; The State Intellectual Property Office of the People's Republic of China.
Notification of Decision to Grant Patent Right for Invention dated Nov. 30, 2020; Chinese Application No. 201780005177.2; China National Intellectual Property Administration.
Extended European Search Report dated Apr. 20, 2020; European Application No. 19204,811.4; European Patent Office; Munich, Germany.
Brown, Joseph Henry; Decision on Appeal dated Apr. 21, 2021; U.S. Appl. No. 15/423,713; United States Patent and Trademark Office; Alexandria, Virginia.
Brown, Joseph Henry; Examiner's Answer dated Jan. 24, 2020; U.S. Appl. No. 15/423,713; United States Patent and Trademark Office; Alexandria, Virginia.
Brown, Joseph Henry; Final Office Action dated Jun. 24, 2019; U.S. Appl. No. 15/423,713; United States Patent and Trademark Office; Alexandria, Virginia.
Brown, Joseph Henry; Office Action dated Mar. 14, 2019; U.S. Appl. No. 15/423,713; United States Patent and Trademark Office; Alexandria, Virginia.
Brown, Joseph Henry; Election/Restriction dated Sep. 26, 2018; U.S. Appl. No. 15/423,713; United States Patent and Trademark Office; Alexandria, Virginia.
Examination Report No. 1 dated Oct. 29, 2021; Australian Application No. 2017213884; IP Australia.
Examination report No. 3 for standard patent application dated May 5, 2022; Australian Application No. 2017213884; IP Australia.
Examination Report No. 2 dated Feb. 9, 2022; Australian Application No. 2017213884; IP Australia.
Examination report No. 4 for standard patent application dated Jul. 14, 2022; Australian Application No. 2017213884; IP Australia.
Office Action dated Jun. 28, 2022; Mexican Application No. MX/a/2018/009507; Mexican Institute of Industrial Property; Mexico City, Mexico.
Notice of acceptance for patent application dated Aug. 24, 2022; Australian Application No. 2022200163; IP Australia.
Office Action dated Oct. 11, 2022; Mexican Application No. MX/a/2018/009507; Mexican Institute of Industrial Property; Mexico City, Mexico.
Office Action dated Nov. 21, 2022; Canadian Application No. 3,013,339; Canadian Intellectual Property Office; Gatineau, Quebec.

* cited by examiner

CONTROL ELEMENTS FOR MATERIALS HANDLING VEHICLES

CROSS REFERENCE TO RELATED APPLICATION

This application is a continuation of U.S. patent application Ser. No. 15/423,713, filed Feb. 3, 2017, which claims the benefit of U.S. Provisional Patent Application Ser. No. 62/291,968, filed Feb. 5, 2016, and entitled "CONTROL ELEMENTS FOR MATERIALS HANDLING VEHICLES", the entire disclosures of which are hereby incorporated by reference herein.

FIELD OF THE INVENTION

The present invention relates generally to control elements for use in materials handling vehicles, wherein the control elements are configurable such that spacing therebetween can be adjusted without modifying structure to which the control elements are mounted.

BACKGROUND OF THE INVENTION

Certain types of materials handling vehicles, such as counterbalance forklift trucks, reach trucks, turret trucks, etc., typically include hand or finger controls (handles, buttons, levers, switches, dials, etc.) for controlling various vehicle functions, such as travel functions, load handling functions, e.g., fork raise/lower, tilt, sideshift, etc., and accessory functions.

BRIEF SUMMARY OF THE INVENTION

The present invention relates to materials handling vehicles that include finger controls for controlling various vehicle functions, such as travel functions, load handling functions, and accessory functions.

In accordance with a first aspect of the present invention, a control module for controlling at least one function of a materials handling vehicle comprises a base portion and a plurality of control elements extending from the base portion and located adjacent to one another. At least one of the control elements includes mounting structure that permits the control element to be selectively mounted to the base portion in at least first and second positions. The first position defines a first distance between the control element and an immediately adjacent control element and the second position defines a second distance between the control element and the immediately adjacent control element, the second distance being greater than the first.

The at least one of the control elements may further comprise a body portion having a bottom surface, and the mounting structure of the at least one of the control elements may comprise a mounting hole that extends from the bottom surface into the body portion and is offset from a center point of the bottom surface. The body portion of the at least one of the control elements may further comprise a central portion and a shoulder portion extending from a side of the central portion. The mounting hole of the at least one of the control elements may be at least partially located in the shoulder portion. The at least one of the control elements may further comprise an additional mounting hole extending from the bottom surface into the body portion, the two mounting holes being spaced apart from one another on the bottom surface of the body portion. The at least one of the control elements may be mountable in at least four positions by mounting the at least one control element in the respective mounting holes and by mounting the at least one control element with the shoulder portion facing opposite directions.

The plurality of control elements may comprise at least three or at least four control elements.

Actuation of the control elements by an operator may control a respective function of the materials handling vehicle, e.g., the control elements may control load handling assembly functions of the vehicle including at least one of: fork raise/lower, fork sideshift, fork tilt, and fork extend.

The control module may further comprise locking structure that can be locked/unlocked by the operator to lock/unlock the control elements in place on the vehicle.

In accordance with a second aspect of the present invention, a control element for controlling at least one function of a materials handling vehicle comprises a body portion having a bottom surface, and mounting structure comprising first and second mounting holes extending into the body portion from the bottom surface. The mounting holes are spaced apart from one another on the bottom surface for selectively receiving a mounting stem of the vehicle to mount the control element in the vehicle. The control element is mountable in at least two positions including: a first position wherein the mounting stem is received in the first mounting hole, and a second position wherein the mounting stem is received in the second mounting hole.

The first and second mounting holes may both be offset from a center point of the bottom surface of the body portion.

The body portion may further include a central portion and a shoulder portion extending from a side of the central portion. At least one of the first and second mounting holes may be at least partially located in the shoulder portion. The control element may be mountable in at least four positions by mounting the control element in the respective first and second mounting holes and by mounting the control element with the shoulder portion facing opposite directions.

The control element may control a load handling assembly function of the vehicle comprising one of: fork raise/lower, fork sideshift, fork tilt, and fork extend.

The control element may further comprise locking structure that can be locked/unlocked by an operator to lock/unlock the control elements in place on the vehicle.

A mounting stem of the at least one of the control elements may be movable with respect to the base portion to effect movement of the at least one of the control elements between the first and second positions.

In accordance with a third aspect of the present invention, a control module for controlling at least one function of a materials handling vehicle comprises a base portion, and a plurality of control elements extending from the base portion and located adjacent to one another. A first one of the control elements includes a shoulder portion extending from a side of a central portion and further includes mounting structure that permits the control element to be mounted to the base portion in a first position wherein the shoulder portion faces a first direction. A second one of the control elements includes a shoulder portion extending from a side of a central portion and further includes mounting structure that permits the control element to be mounted to the base portion in a second position wherein the shoulder portion faces a second direction different than the first direction. The first position defines a first distance between the first one of the control elements and an immediately adjacent control element and the second position defines a second distance between the second one of the control elements and the immediately adjacent control element, the second distance being greater than the first.

The first one of the control elements may further comprise a body portion having a bottom surface and the mounting structure of the first one of the control elements may comprise a mounting hole that extends from the bottom surface into the body portion and is offset from a center point of the bottom surface. The mounting hole of the first one of the control elements may be at least partially located in the shoulder portion. The first one of the control elements may further comprise an additional mounting hole extending from the bottom surface into the body portion, the two mounting holes being spaced apart from one another on the bottom surface of the body portion. The first one of the control elements may be mountable in at least four positions by mounting the first one control element in the respective mounting holes and by mounting the at least one control element with the shoulder portion facing opposite directions.

The plurality of control elements may comprise at least three or at least four control elements.

The plurality of control elements may control load handling assembly functions of the vehicle including at least one of: fork raise/lower, fork sideshift, fork tilt, and fork extend.

The control module may further comprise locking structure that can be locked/unlocked by the operator to lock/unlock the control elements in place on the vehicle.

A mounting stem of the first one of the control elements may be movable with respect to the base portion to effect movement of the first one of the control elements between the first and second positions.

BRIEF DESCRIPTION OF THE SEVERAL VIEWS OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

(FIG. 5D is taken along line 5D-5D in FIG. 5B) of one of the control elements of FIG. 2;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
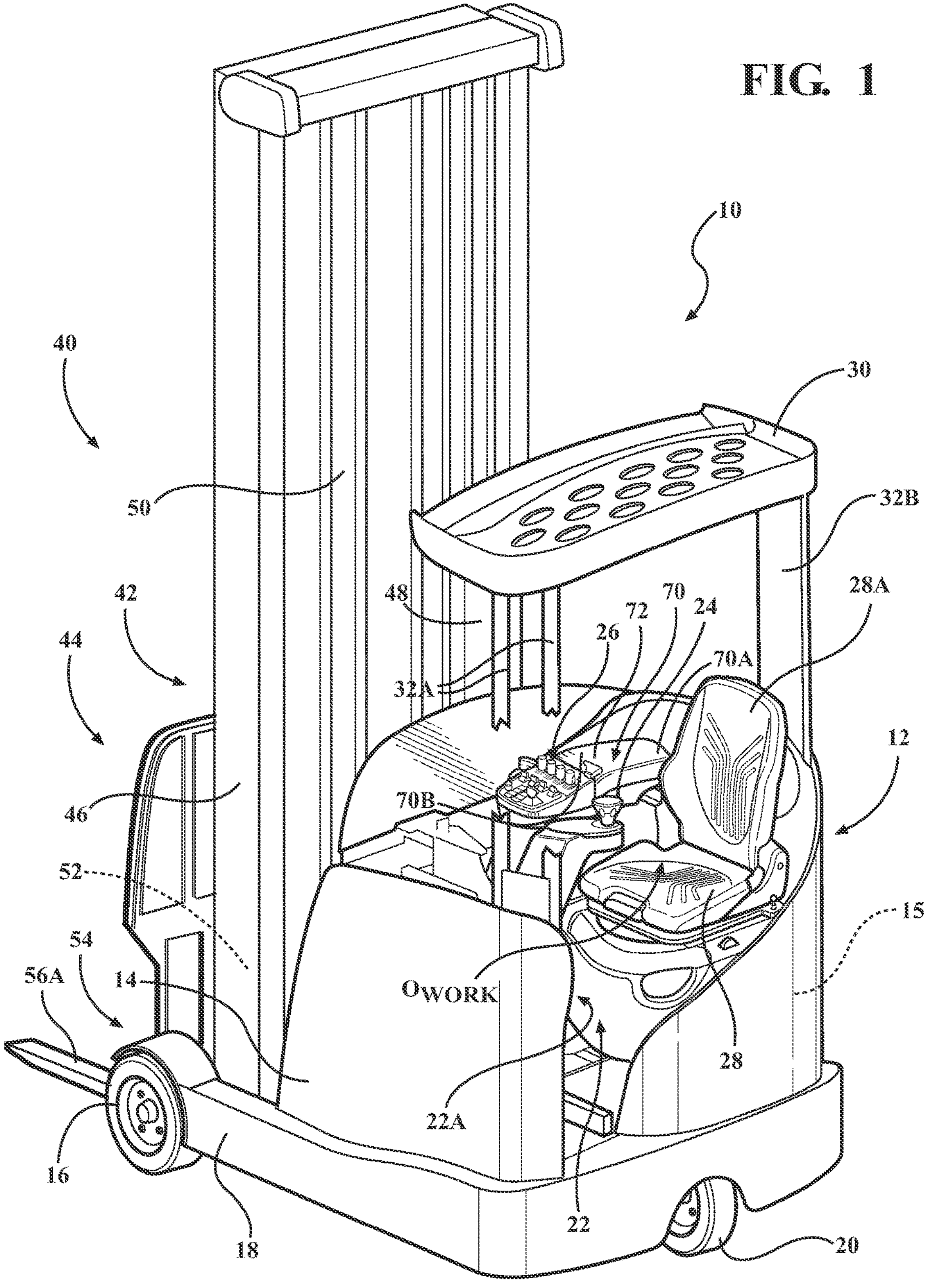
FIG. 1 is a perspective view of a materials handling vehicle comprising an armrest having a control module including a plurality of control elements according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a power unit 12, which includes a frame 14 defining a main structural component of the vehicle 10 and which houses a battery 15. The vehicle 10 further comprises a pair of fork-side first wheels 16 (only one first wheel is shown in FIG. 1) coupled to first and second outriggers 18 (only one outrigger is shown in FIG. 1), and a powered and steered second wheel 20 located underneath the frame 14. The wheels 16, 20 allow the vehicle 10 to move across a floor surface.

An operator's compartment 22 is located within the power unit 12 for receiving an operator driving the vehicle 10. A tiller knob 24 is provided within the operator's compartment for controlling steering of the vehicle 10. The speed and direction of movement (forward or reverse) of the vehicle 10 are controlled by the operator via a control module 26 provided adjacent to an operator seat 28, which control module 26 controls one or more other vehicle functions and will be discussed in greater detail below. The vehicle 10 further includes an overhead guard 30 including first and second horizontal support structures 32A, 32B affixed to the frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested lower and upper movable mast members 48, 50. It is noted that the vehicle 10 may include additional or fewer movable mast members than the two shown in FIG. 1, i.e., the lower and upper movable mast members 48, 50. The carriage assembly 44 includes conventional structure including a reach assembly 52, a fork carriage 54, and fork structure comprising a pair of forks 56A.

The battery 15 supplies power to a traction motor (not shown) connected to the second wheel 20 and to one or more hydraulic motors (not shown), which supply power to several different systems, such as hydraulic cylinders for effecting generally vertical movement of the movable mast members 48, 50, generally vertical movement of the carriage assembly 44 relative to the mast assembly 42, generally longitudinal movement of the reach assembly 52, commonly referred to as reach, and generally transverse or lateral movement of the fork carriage 54, commonly referred to as sideshifting. The traction motor and the second wheel 20 define a drive mechanism for effecting movement of the vehicle 10 across the floor surface.

Figure 2:
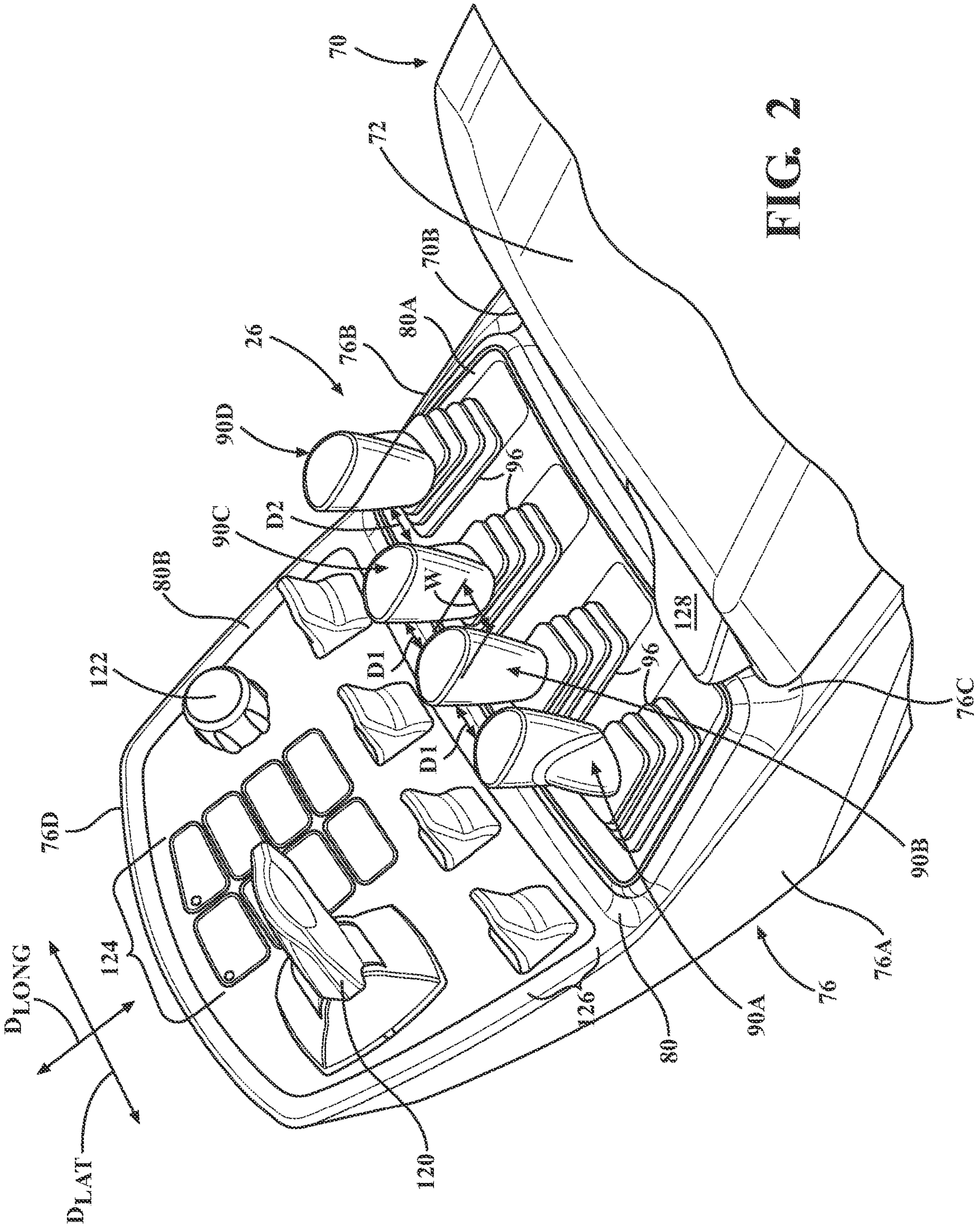
FIG. 2 is a perspective view of a distal portion of an armrest of the materials handling vehicle of FIG. 1, the armrest portion including a plurality of control elements according to an aspect of the present invention.

An armrest 70 is provided in the operator's compartment 22 proximate to the control module 26, see FIGS. 1 and 2. The armrest 70 includes a pad 72 for receiving the arm of an operator using the control module 26. A first end 70A of the armrest 70 (see FIG. 1) is located adjacent to a seatback cushion 28A of the operator seat 28 and may receive the operator's elbow, and a second end 70B of the armrest 70, which comprises a distal end of the armrest 70 and is spaced from the first end 70A, is located adjacent to the control module 26 and may receive the operator's wrist or forearm.

Referring now to FIG. 2, the control module 26 includes a base portion 76 that includes an upper surface 80 spanning laterally between first and second sides 76A, 76B of the base portion 76 and spanning longitudinally between first and second ends 76C, 76D of the base portion 76. As used herein and with reference to FIG. 2, the lateral direction $D_{LAT}$ is defined between the first side 76A of the base portion 76, which is located proximate to an operator working position $O_{WORK}$ within the operator's compartment 22 (see FIG. 1), e.g., the position of the operator while sitting on the operator seat 28, and the second side 76B of the base portion 76, which is located distal from the operator working position $O_{WORK}$. The longitudinal direction $D_{LONG}$ is in turn defined between the first end 76C of the base portion 76, which is located proximate to the armrest 70, and the second end 76D of the base portion 76, which is located distal from the armrest 70.

The upper surface 80 of the base portion 76 may define a generally planar surface, i.e., a flat surface, or the upper surface 80 may comprise a non-planar surface as shown in FIG. 2. In the embodiment shown, the upper surface 80 includes a first section 80A extending generally parallel to a plane defined by the armrest 70, and a second section 80B angled upwardly from the first section 80A.

Referring still to FIG. 2, the control module 26 includes a plurality of control structures for controlling various vehicle structures and functions, such as travel functions, load handling functions, e.g., fork raise/lower, fork tilt, fork sideshift, fork extend, etc., and accessory functions. A first plurality of the control structures comprise four control elements 90A-90D extending upwardly from the first section 80A of the base portion upper surface 80 and located laterally adjacent to one another, although additional or fewer control elements may be used, such as, for example, two control elements, three control elements, or five or more control elements. The control elements 90A-90D are actuated by an operator's fingers for controlling, for example, fork raise/lower (first control element 90A), fork tilt (second control element 90B), fork side shift (third control element 90C), and a fourth function, such as fork extend, pinching/clamping the forks 56A together, changing the spacing between the forks 56A, etc. (fourth control element 90D). It is noted that other types of vehicle functions could be controlled by the control elements 90A-90D without departing from the scope and spirit of the invention.

Figure 5A:
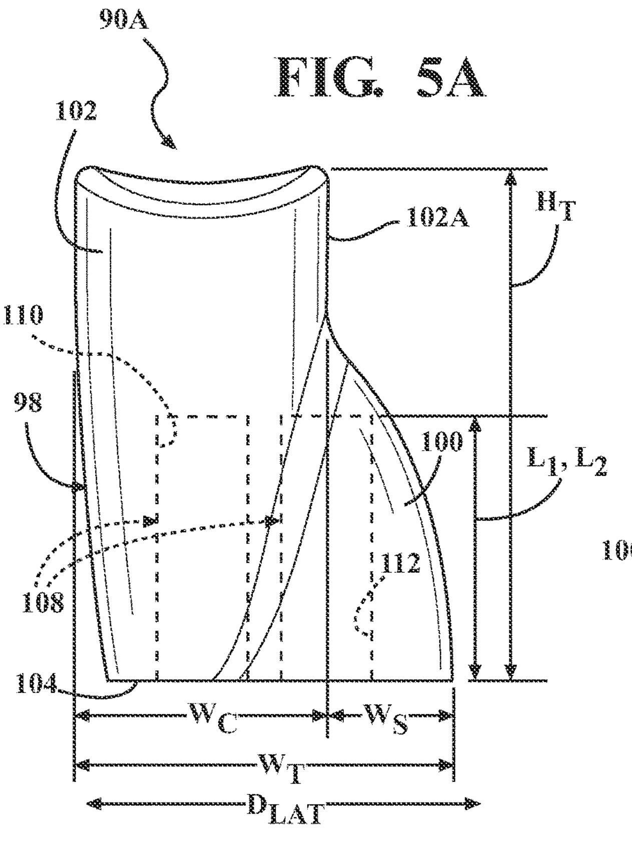
FIGS. 5A-5E are, respectively, front (FIG. 5A), back (FIG. 5B), side (FIG. 5C), cross sectional (5D), and enlarged bottom (FIG. 5E) views
Figure 5B:
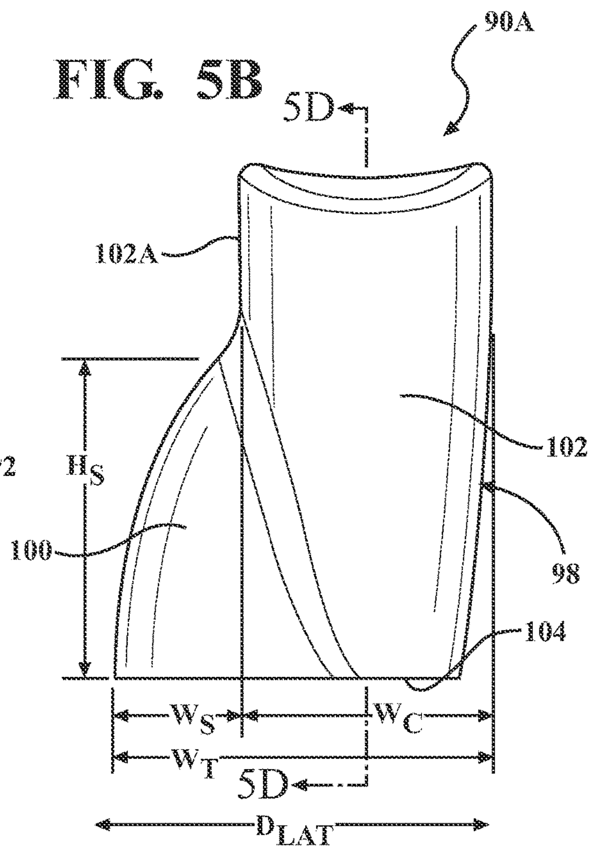
Figure 5C:
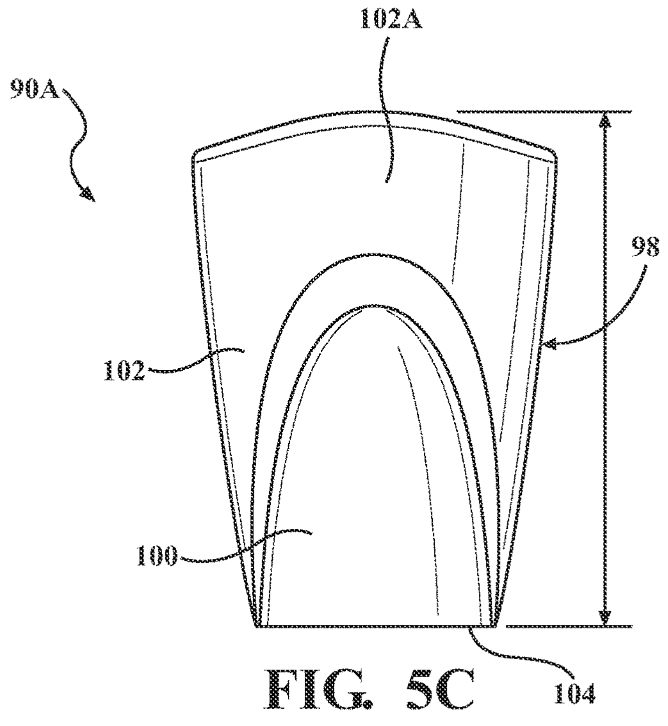
Figure 5D:
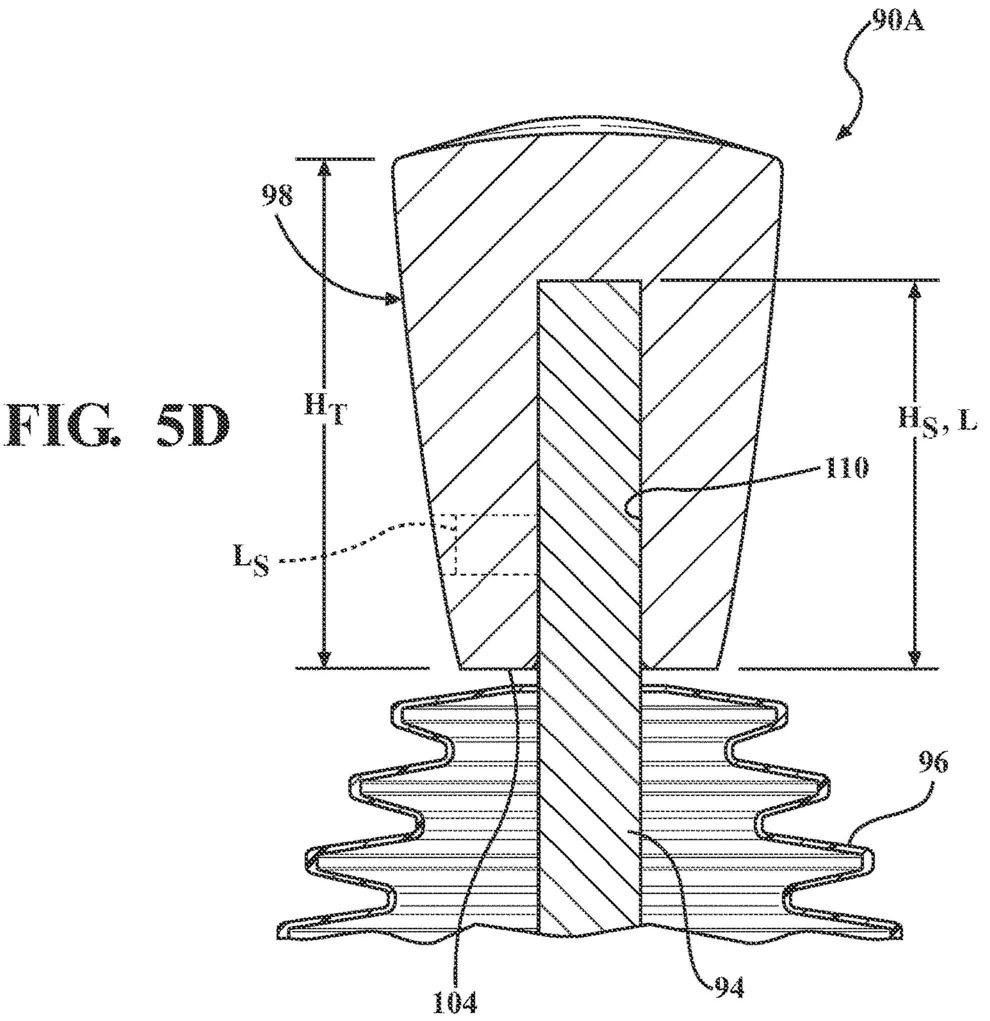

The control elements 90A-90D are mounted to the first section 80A of the base portion upper surface 80 via respective mounting stems 94, see FIG. 5D. The mounting stems 94 are affixed to the base portion 76 such that back and forth and/or side to side rocking movement of the respective control elements 90A-90D is/are allowed, wherein such an affixation of the mounting stems 94 to the base portion 76 may be made in any conventional manner. For example, moving the first control element 90A forward may cause the forks 56A to be raised (via raising the carriage assembly 44 or the mast and carriage assemblies 42, 44), and moving the first control element 90A backward may cause the forks 56A to be lowered (via lowering the carriage assembly 44 or the mast and carriage assemblies 42, 44). As another example, moving the second control element 90B forward may cause the forks 56A to tilt forward, and moving the second control element 90B backward may cause the forks 56A to tilt backward. As yet another example, moving the third control element 90C forward may cause the forks 56A to sideshift to the left, and moving the third control element 90C backward may cause the forks 56A to sideshift to the right. As a further example, in accordance with the fourth function noted above, moving the fourth control element 90D forward may cause the forks 56A to move in a first direction, and moving the fourth control element 90D backward may cause the forks 56A to move in the opposite direction. It is noted that one or more of the control elements 90A-90D may be capable of being rocked to the left and/or right in lieu of or in addition to being rocked to the front and back as described above.

Preferably, protective stem covers 96 are provided over the stems 94 to prevent debris from entering the area where the stems 94 are affixed to the base portion 76. The stem covers 96 also militate against pinching of the operator's fingers between the stems 94 and the base portion 76 when the operator is operating the control elements 90A-90D.

Figure 3:
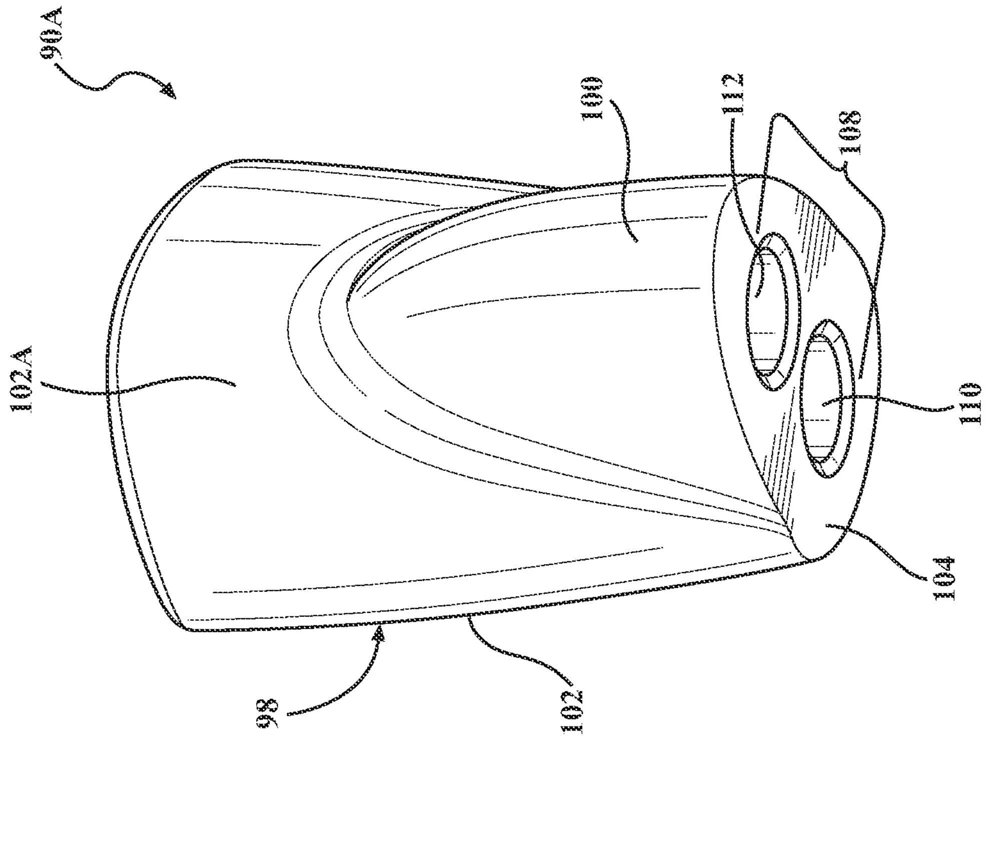
FIGS. 3 and 4 are perspective views of one of the control elements of FIG. 2.
Figure 4:
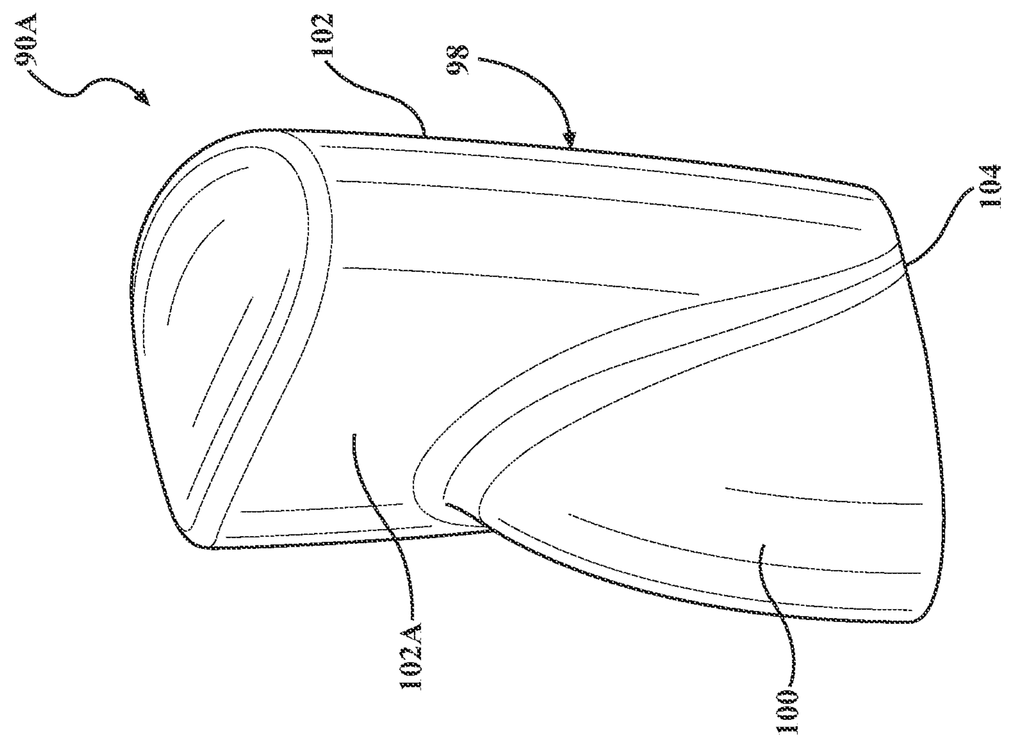

With reference now to FIGS. 3 and 4, which illustrate the first control element 90A of FIG. 2, in accordance with an aspect of the present invention, at least one of the control elements comprises a body portion 98 that includes a shoulder portion 100 extending laterally from a side 102A of a central portion 102 of the body portion 98. The shoulder portion 100 may provide the body portion 98 with a non-uniform (irregular) cross section, i.e., a non-circular/ovular/square/rectangular cross section, as measured at a bottom surface 104 of the body portion 98. For example, as most clearly shown in FIG. 5E, the central portion 102 of the body portion 98 may define a generally uniform circular or oval cross section at the bottom surface 104, while the shoulder portion 100 defines an arched-shape cross section, extending from the circular or oval cross section defined by the central portion 102, thus providing the body portion 98 with an overall non-uniform (irregular) cross section.

Referring now to FIGS. 5A and 5B, the shoulder portion 100 of the body portion 98 may have a width $W_S$, as measured in the lateral direction $D_{LAT}$, that increases as the shoulder portion 100 extends down toward the bottom surface 104 of the body portion 98. The width $W_S$ of the shoulder portion 100 at the bottom surface 104 may be about ½ to about 1.5/1 of a width $W_C$ of the central portion 102, as measured in the lateral direction $D_{LAT}$ at the bottom surface 104. Hence, the shoulder portion 100 may result in the first control element 90A having a total width $W_T$, as measured in the lateral direction $D_{LAT}$ at the bottom surface 104 (see FIG. 5A), that is about 50-150% larger than a width W of a control element that does not include a shoulder portion (see, for example, the second control element 90B in FIG. 2). As shown in FIGS. 5A and 5B, the width $W_S$ of the shoulder portion 100 of the illustrated first control element 90A may be less than to about the same as the width $W_C$ of the central portion 102, thus increasing the total width $W_T$ of the first control element 90A over the width W of the second control element 90B by about 50-100%, which second control element 90B only includes the central portion 102 and not the shoulder portion as noted above. The width $W_S$ of the shoulder portion 100 of the first control element 90A may also be greater than the width We of the central portion 102.

A height $H_S$ of the shoulder portion 100 may be about ¼ to about 1/1 of a total height $H_T$ of the body portion 98. The height $H_S$ of the shoulder portion 100 of the control element 90A shown in FIGS. 5A and 5B is about ⅔ of the total height $H_T$ of the body portion 98.

Figure 5E:
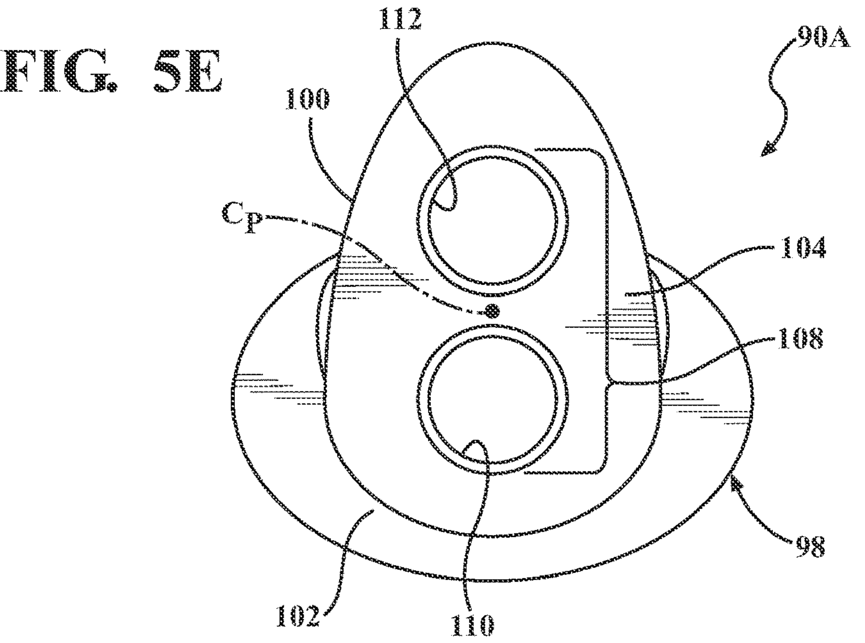

As shown in FIGS. 3, 5A, and 5E, the control element 90A includes mounting structure 108, which, according to an aspect of the invention, comprises two mounting holes 110, 112 extending up into the body portion 98 of the control element 90A from the bottom surface 104 for selectively receiving the mounting stem 94. It is noted that the mounting structure 108 could include more than two mounting holes without departing from the scope and spirit of the invention. It is also noted that spacing between the mounting holes 110, 112 is preferably sufficient so as to preserve the structural rigidity of the body portion 98.

The first mounting hole 110 may be located generally in the center of the central portion 102 of the control element 90A, and the second mounting hole 112 may be located toward the shoulder portion 100 of the control element 90A. As shown in FIG. 5E, both mounting holes 110, 112 are laterally offset with respect to a center point $C_P$ of the bottom surface 104 of the control element 90A. Specifically, the first mounting hole 110 is offset from the center point $C_P$ in a direction away from the shoulder portion 100, and the second mounting hole 112 is offset from the center point $C_P$ in a direction toward the shoulder portion 100 and is at least partially located in the shoulder portion 100. As shown in FIG. 5A, the first mounting hole 110 may extend up into the body portion 98 a length $L_1$ of about ⅔ of the height $H_T$ of the body portion 98, and the second mounting hole 112 may extend up into the body portion 98 a length $L_2$ of about ½ of the height $H_T$ of the body portion 98. The lengths $L_1$, $L_2$ of the respective mounting holes 110, 112 are preferably large enough to accommodate the mounting stem 94 while fully lowering the control element 90A down to the upper surface of the stem cover 96.

The two mounting holes 110, 112 facilitate mounting of the control element 90A on the base portion 76 in a plurality of different positions. For example, the control element 90A may be mounted such that: 1) the mounting stem 94 is located in the second mounting hole 112 with the shoulder portion 100 facing to the left with reference to FIG. 2 (this position is hereinafter referred to as the "far right position" since the central portion 102 of the control element 90A is as far to the right as possible using the mounting holes 110, 112); 2) the mounting stem 94 is located in the first mounting hole 110 with the shoulder portion 100 facing to the left with reference to FIG. 2 (this position is hereinafter referred to as the "middle right position" since the central portion 102 of the control element 90A is less far to the right than as in the far right position); 3) the mounting stem 94 is located in the second mounting hole 112 with the shoulder portion 100 facing to the right with reference to FIG. 2 (this position is hereinafter referred to as the "far left position" since the central portion 102 of the control element 90A is as far to the left as possible using the mounting holes 110, 112); or 4) the mounting stem 94 is located in the first mounting hole 110 with the shoulder portion 100 facing to the right with reference to FIG. 2 (this position is hereinafter referred to as the "middle left position" since the central portion 102 of the control element 90A is less far to the left than as in the far left position). All four of these exemplary positions are facilitated by the configuration of the control element 90A without requiring a modification to the structure of the base portion 76 of the control module 26 or the mounting stems 94. By using one or more control elements with shoulder portions 100 in the first plurality of control structures, lateral spacing between adjacent control elements 90A-90D can be adjusted without requiring a modification to the structure of the base portion 76 of the control module 26 or the mounting stems 94, as will be described in greater detail below.

Mounting structure (not shown) of the second control element 90B, which does not include a shoulder portion as noted above, may include only a single mounting hole located generally at the center point of the bottom surface of the second control element 90B.

With reference to FIG. 2, the control module 26 further comprises a second plurality of control structures for controlling various vehicle functions, such as travel functions, load handling functions, and/or accessory functions. Exemplary illustrated structures in FIG. 2, which are associated with the second section 80B of the base portion upper surface 80, include: a switch 120 (to be further described below) for causing the vehicle 10 to shift between forward travel, neutral, and rearward travel modes; a dial 122 for interacting with a display screen (not shown) mounted within the vehicle 10; a plurality of buttons 124 for controlling vehicle structure and functions such as lights, windshield wipers and washers, emergency flashers, window/windshield defoggers, etc.; and a plurality of levers 126, which may be used to toggle the control elements 90A-90D between primary function (as discussed above) and secondary functions as will be appreciated by those having ordinary skill in the art. The second plurality of control structures could vary and could control alternative vehicle functions as desired.

A horn button 128 is also provided at the second end 70B of the armrest 70 for sounding a vehicle horn, see FIG. 2.

As noted above, by using one or more control elements with shoulder portions 100 in the first plurality of control structures, spacing between adjacent control elements 90A-90D can be adjusted without requiring a modification to the structure of the base portion 76 of the control module 26 or the mounting stems 94. With reference to the exemplary control element configuration shown in connection with the control module 26 illustrated in FIG. 2, the first, third, and fourth control elements 90A, 90C, 90D include shoulder portions 100, and the second control element 90B does not include a shoulder portion. The first, third, and fourth control elements 90A, 90C, 90D are thus mountable in any one of the four exemplary locations on their respective mounting stems 94 as described above, e.g., the control elements 90A, 90C, 90D are mountable in the far right position, the middle right position, the far left position, or the middle left position.

In FIG. 2, the first control element 90A is illustrated in the far right position, and the third and fourth control elements 90C, 90D are illustrated in far left positions. The first control element 90A, located in the far right position as shown in FIG. 2, is located a first distance D1 from the second control element 90B. The third control element 90C, located in the far left position as shown in FIG. 2, is also located the first distance D1 from the second control element 90B (this is assuming that the mounting stems 94 for the first, second, and third control elements 90A-90C are the same distance apart). Since the fourth control element 90D is also located in the far left position as shown in FIG. 2, the fourth control element 90D is located a second distance D2 from the third control element 90C, the second distance D2 being greater than the first distance. Additional distances between control elements 90A-90D are also possible, including but not limited to: a minimum distance smaller than the first and second distances D1, D2, which minimum distance is effected by a control element in a far right position immediately adjacent to a control element in a far left position (moving from left to right); an intermediate distance, which is effected by two control elements without shoulder portions adjacent to one another; and a maximum distance greater than the first and second distances D1, D2, which maximum distance is effected by a control element in a far left position immediately adjacent to a control element in a far right position (moving from left to right). These various distances between adjacent control elements can be effected by changing the type of control element (with or without a shoulder portion), and/or, for control elements with shoulder portions, changing the mounting hole used for mounting the control element and/or by changing the direction that the shoulder portion faces. As noted above, these distances between adjacent control elements are effected without requiring a modification to the structure of the base portion 76 of the control module 26 or the mounting stems 94.

The positioning and type, i.e., with or without shoulder portion 100, of the control elements 90A-90D can be tailored to a particular operator as desired for ergonomic reasons, comfort, and accessibility. For example, for ergonomic reasons, an operator may wish to have tighter spacing between some or all of the control elements 90A-90D, e.g., so the operator can easily rest their fingers on top of the control elements 90A-90D while the operator's hand is in a relaxed or default position, or the operator may wish to have looser spacing between some or all of the control elements 90A-90D, e.g., so the operator can easily rest their fingers between adjacent control elements 90A-90D while the operator's hand is in a relaxed or default position. As another example, an operator with smaller than average hands or fingers may want the control elements 90A-90D to be closer together, or an operator with larger than average hands or fingers may want the control elements 90A-90D to be farther apart.

Vehicles may be sent to the customer with the desired positioning and type of control elements (with or without shoulder portion) pre-installed, or a qualified service technician may implement modifications, e.g., by swapping out control elements with shoulder portions 100 for ones without, or vice versa, by changing the direction in which the shoulder portion 100 faces, or by changing the mounting hole. Further, an operator may be capable of changing the positioning and/or control element type in the field. The control elements 90A-90D, the mounting stems 94, and/or the base portion 76 may include locking structure $L_S$ (see FIG. 5D) that can be locked/unlocked by the operator to lock the control elements 90A-90D in place to prevent unwanted decoupling from the base portion 76.

As noted above, one or more of the control elements 90A-90D may be capable of being rocked to the left and/or right in lieu of or in addition to being rocked to the front and back. It is contemplated that two control elements, which each are capable of being rocked side to side and front to back, could be utilized with the base portion 76 instead of the four control elements 90A-90D described above. In such a configuration, the two control elements, each with four degrees of motion (left, right, front, and back) for a total of eight supported functions, could support the same functions as the four control elements 90A-90D described above, which each include two degrees of motion (front and back), also for a total of eight supported functions. The aspects of the present invention described above for changing the spacing between adjacent control elements could also be applied to such a two control element configuration.

As shown in FIGS. 6A-6D, the switch 120 that is used to control the travel direction of the vehicle 10 has a unique shape that allows the operator to reach the switch 120 without the need to excessively move their hand to actuate the switch 120. In one embodiment, the operator uses their index and/or middle finger to actuate the switch 120 to a desired position, e.g., a forward position for forward travel, a rearward position for rearward travel, or an intermediate (default) position for neutral by extending their chosen finger(s) past the respective control element/s 90A and 90B (index finger in the embodiment shown) or 90B and 90C (middle finger in the embodiment shown). While the switch 120 disclosed herein may be positioned for engagement by the index and/or middle fingers, other configurations are envisioned, such as where the switch 120 is positioned on the base portion upper surface 80 further to the right than as shown and is also engageable by the middle, ring, and/or pinky finger(s).

Figure 6A:
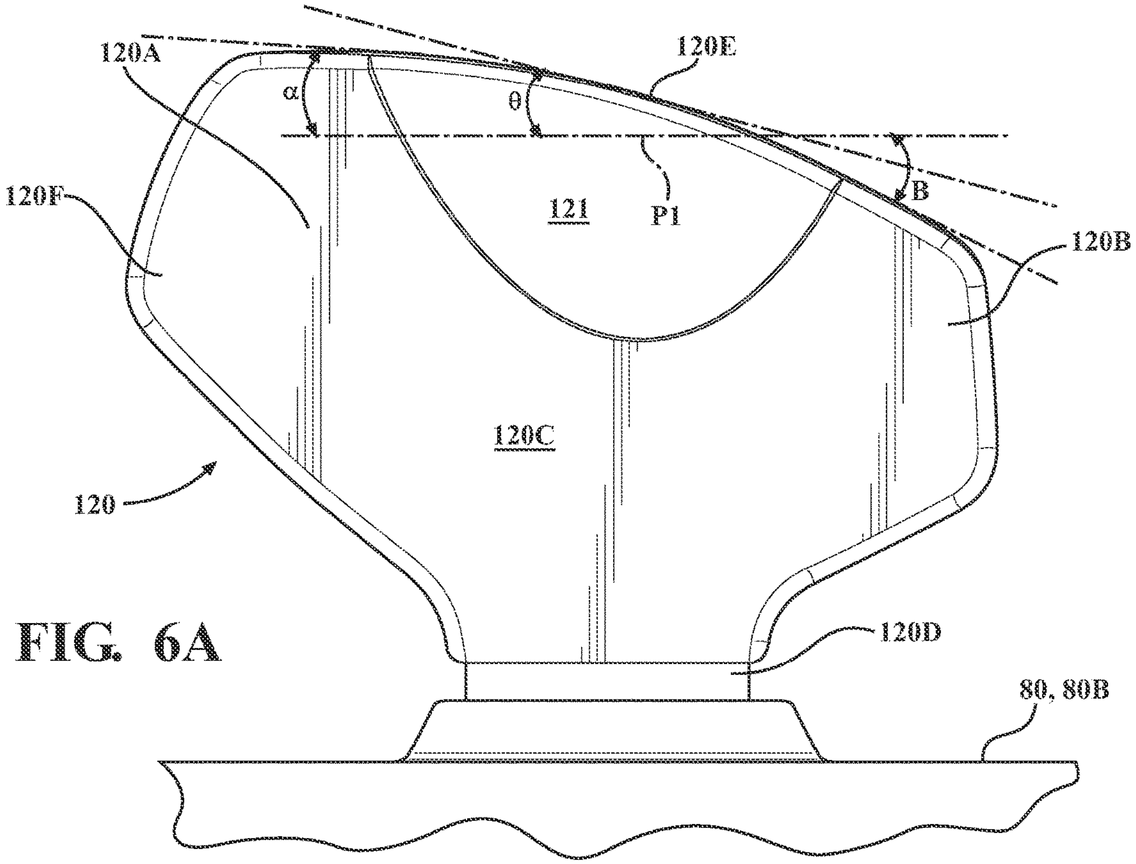
FIGS. 6A, 6B, 6C, and 6D are, respectively, front, back, side, and top views of a switch provided on the armrest portion of FIG. 2.
Figure 6D:
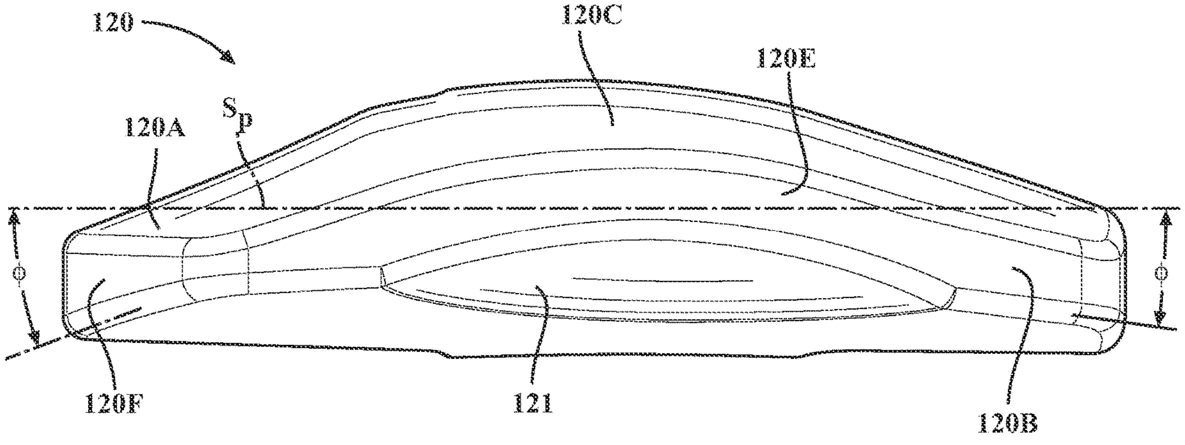
Figure 6B:
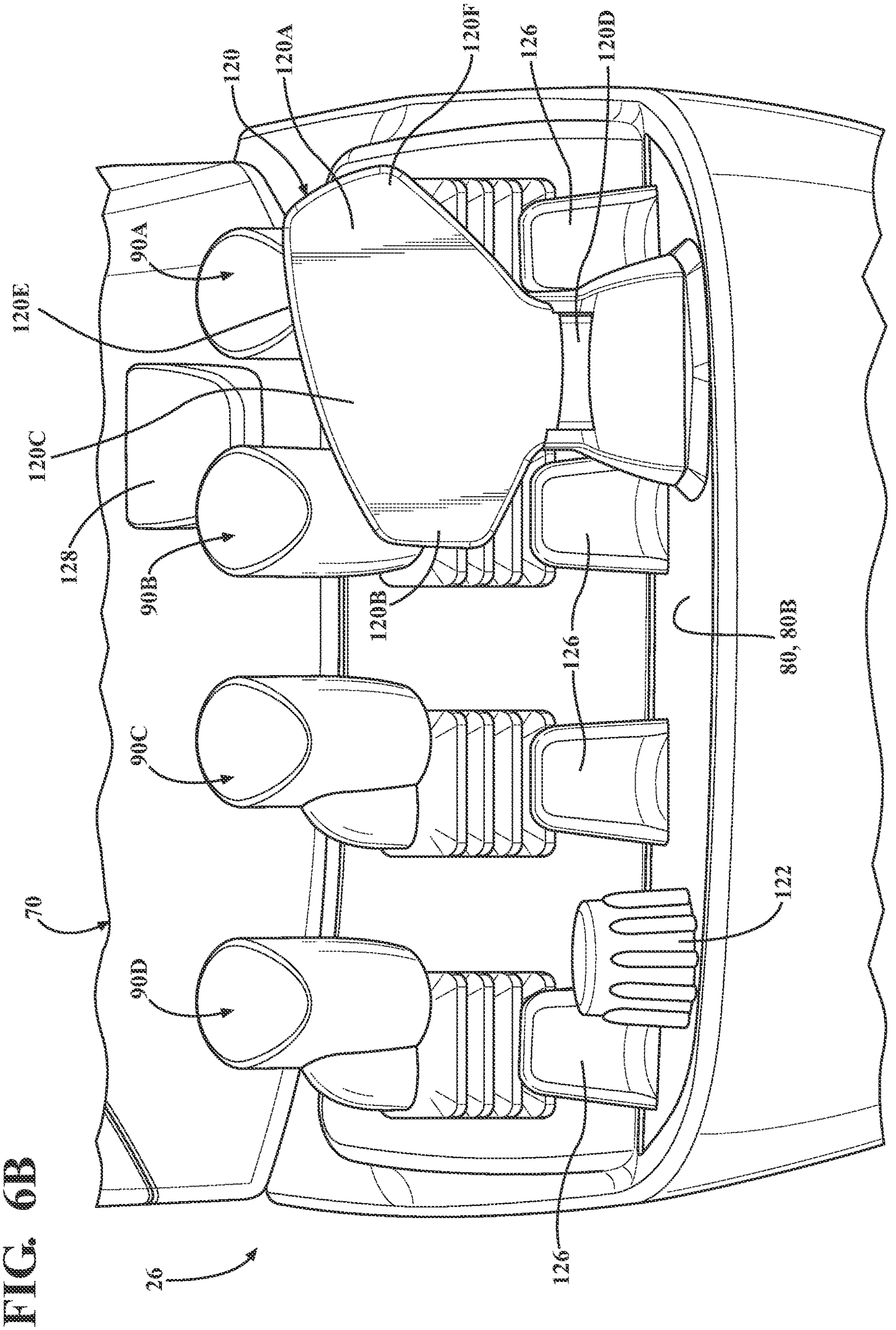
Figure 6C:
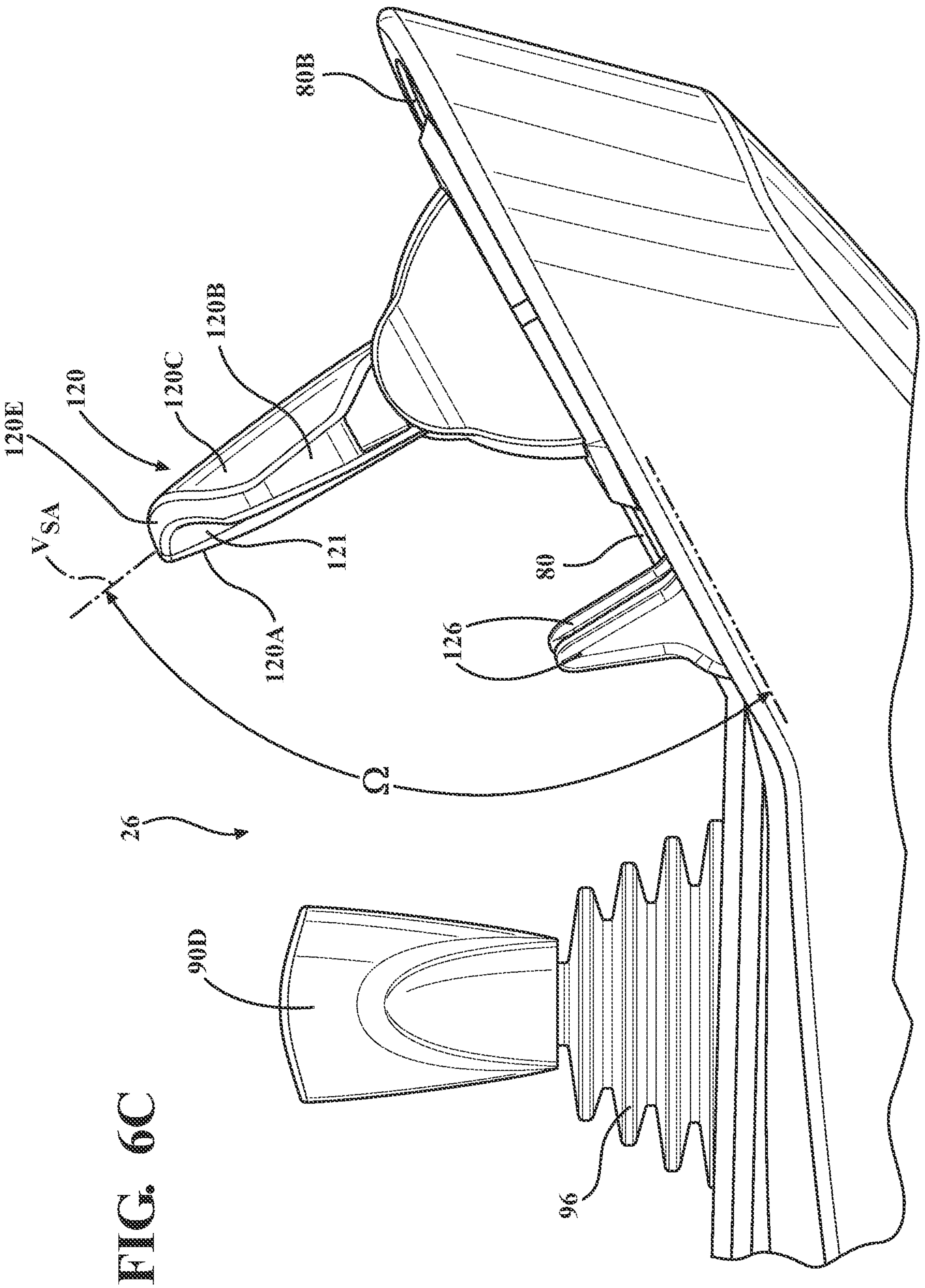

The switch 120 includes a left extension 120A and a right extension 120B (left and right are defined with respect to an operator facing the switch 120) that extend laterally in opposite directions from a mid portion 120C of the switch 120 and are substantially orthogonal to a vertical switch axis $V_{SA}$, see FIG. 6C. A stem portion 120D is aligned substantially along the vertical switch axis $V_{SA}$ and is coupled to the mid portion 120C. The stem portion 120D is hingedly connected to the second section 80B of the base portion upper surface 80 and defines the actuation of the switch 120 between the forward, rearward, and intermediate positions.

With reference to FIG. 6D, the left extension 120A and the right extension 120B are swept forward at an angle Ø from a switch plane $S_P$ to enable actuation of the switch 120 using one or more fingers of the operator. In one embodiment, the angle Ø is the same for the left extension 120A and the right extension 120B. In an alternate embodiment, the angle Ø is different for the left extension 120A and the right extension 120B. Further, at least a portion of a front face 121 of the switch 120 may define a curved surface as most clearly shown in 6D, or the front face 121 may define a flat, planar surface. In the embodiment shown, the angle Ø of the left extension 120A and the right extension 120B takes into account known typical lengths of index and middle fingers. Testing was also performed to verify usability of the switch 120 for operators having large and small sized hands and/or fingers, and the unique configuration of the switch 120 allowed all of the tested operators to easily reach the switch 120 through and/or over the control elements 90A-90D. In one embodiment, the angle Ø is about 7 degrees to about 20 degrees for the left extension 120A and about 5 degrees to about 17 degrees for the right extension 120B, although other angles could be used.

With reference to FIG. 6A, the left extension 120A extends at an angle $\alpha$ upwardly from the mid portion 120C (away from the base portion upper surface 80), the angle $\alpha$ in one embodiment between 5-30 degrees relative to a plane $P_1$ that is parallel to the base portion upper surface 80, and the right extension 120B extends at an angle $\beta$ downwardly from the mid portion 120C (toward the base portion upper surface 80), the angle $\beta$ in one embodiment between 5-30 degrees relative to the plane $P_1$. In the embodiment shown, the mid portion 120C itself is also angled relative to the plane $P_1$ at an angle $\theta$ of between 5-30 degrees. In another embodiment, the angles $\alpha$, $\beta$, and $\theta$ may be between 10-20 degrees relative to the plane $P_1$, and in yet another embodiment the angles $\alpha$, $\beta$, and $\theta$ may be about 15 degrees, e.g., between 14 and 16 degrees, relative to the plane $P_1$. In one embodiment, the combination of the right extension 120B, the mid portion 120C, and the left extension 120A define a smooth and slightly curved upper surface 120E. In one embodiment, the angles α, β, and θ may be generally equal to one another to define a generally straight/planar upper surface 120E. The extension 120A, 120B, 120C of the switch 120 may have other angles relative to the plane $P_1$, including being generally parallel to the plane $P_1$.

Referring still to FIG. 6B, the left extension 120A may include a distal portion 120F that extends downward and laterally from the upper surface 120E to define a further engagement area for a finger of the operator.

In one embodiment, the vertical switch axis $V_{SA}$ is inclined toward the operator, for example, at an angle Ω of about 90 degrees relative to the base portion upper surface 80 (although other angles are contemplated) while the switch 120 is in the intermediate (neutral) position, see FIG. 6C. The angle Ω of the switch 120 as defined by the vertical switch axis $V_{SA}$ allows for easier access to the switch 120 by the operator's finger(s) since the switch 120 extends toward the operator.

As noted above, in one embodiment the left extension 120A and right extension 120B are positioned for an index and a middle finger of an operator to reach the switch 120, such that the design of the switch 120 and its respective left extension 120A and right extension 120B allow the operator to easily engage either the left extension 120A and/or the right extension 120B with the index or middle finger to actuate the switch 120, e.g., the pull the switch toward the operator, push the switch away from the operator, or to move the switch into an intermediate position. In one embodiment, pulling the switch 120 toward the operator may cause the vehicle 10 to enter a travel rearward mode and pushing the switch 120 away from the operator may cause the vehicle 10 to enter a travel forward mode, additional configurations are contemplated, such as one wherein pulling the switch 120 toward the operator may cause the vehicle 10 to enter a travel forward mode and pushing the switch 120 away from the operator may cause the vehicle 10 to enter a travel rearward mode.

Moreover, while the switch 120 according to this aspect of the invention may be used in combination with any type of additional vehicle controls or no additional vehicle controls, the ability to change the lateral spacing between the control elements 90A-90D as discussed in detail herein allows the operator to even more easily reach either the left extension 120A and/or the right extension 120B with the index or middle finger to actuate the switch 120. For example, additional spacing can be obtained between respective control elements 90A, 90B or 90B, 90C as described herein to provide a larger reach area therebetween. Moreover, if the switch 120 is used in combination with the control elements disclosed herein, instead of reaching through the control elements, the operator could reach over the control elements to operate the switch 120.

Figure 7:
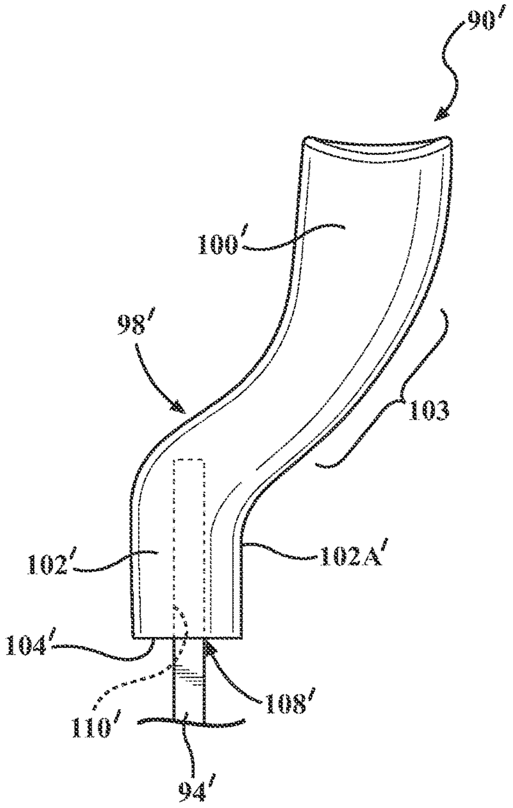
FIG. 7 is a front view of a control element according to another aspect of the present invention.

With reference now to FIG. 7, a control element 90' according to another aspect of the invention is shown, wherein structure similar to that described above with reference to FIGS. 1-5E includes the same reference number followed by a prime (') symbol.

As shown in FIG. 7, the control element 90' comprises a body portion 98' including a central portion 102' and a shoulder portion 100' extending from a side 102A' of the central portion 102'. The central portion 102' according to this aspect of the present invention does not extend to the top of the body portion 98', as the central portion 102' terminates near the location where the shoulder portion 100' extends from the side 102A' of the central portion 102'. The shoulder portion 100' thus defines the uppermost portion of the control element 90'.

As shown in FIG. 7, the shoulder portion 100' according to this aspect of the invention defines a curved portion 103 that curves up and away from the central portion 102'. The control element 90' can be mounted in first and second positions on an associated mounting stem 94' (i.e., with the shoulder portions 100' facing the right as shown in FIG. 7 or with the shoulder portions 100' facing the left) to effect a change in spacing between the control element 90' and an immediately adjacent control element as described herein.

Figure 8:
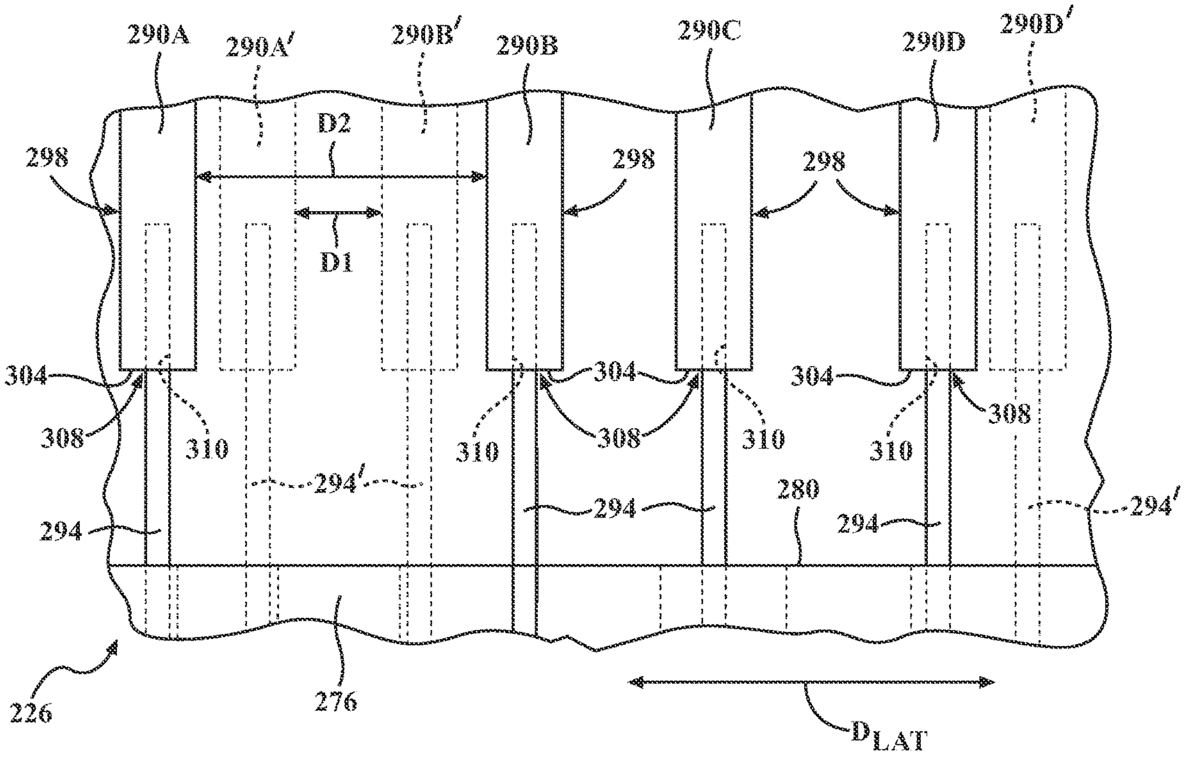
FIG. 8 is a diagrammatic view of a portion of a control module in accordance with another aspect of the present invention.

Referring now to FIG. 8, a portion of a control module 226 in accordance with yet another aspect of the present invention is illustrated, wherein structure similar to that described above with reference to FIGS. 1-5E includes the same reference number increased by 200.

As shown in FIG. 8, a plurality of control elements 290A-290D extend generally upwardly from an upper surface 280 of a base portion 276 of the control module 226. The control elements 290A-290D include mounting structure 308, which may comprise a single opening 310 for receiving a corresponding mounting stem 294 affixed to the base portion 276. The opening 310 may be centrally formed in a bottom surface 304 of a body portion 298, or the opening 310 may be offset with respect to a center point of the bottom surface 304.

According to an aspect of the invention, the mounting stems 294 shown in FIG. 7 are movable in the lateral direction $D_{LAT}$ between multiple positions with respect to the base portion 276, see, for example, the dashed-line mounting stems 294' with associated dashed-line control elements 290A', 290B', and 290D'. It is noted that each of the mounting stems 294 and their associated control elements 290A-290D may be moveable between multiple positions, or only select ones of the mounting stems 294 and their associated control elements 290A-290D may be moveable between multiple positions as shown in FIG. 7, i.e., where the mounting stem 294 and its associated third control element 290C are in a fixed position.

Since the mounting stems 294 according to this aspect of the invention are movable laterally to different positions, the mounting structures 308 of the control elements 290A-290D permit the control elements 290A-290D to be selectively mounted to the base portion 276 in multiple positions, including the first and second positions of the control elements 290A, 290B, 290D shown in solid and dashed lines in FIG. 8. For example, as shown in FIG. 8, while in the dashed line positions, a first distance $D_1$ is defined between the first and second control elements 290A, 290B, and while in the solid line positions, a second distance $D_2$ is defined between the first and second control elements 290A, 290B, the second distance $D_2$ being greater than the first distance $D_1$. Similar differences in distances between immediately adjacent control elements 290A-290D can be effected by laterally moving others of the control elements between positions.

Figure 9B:
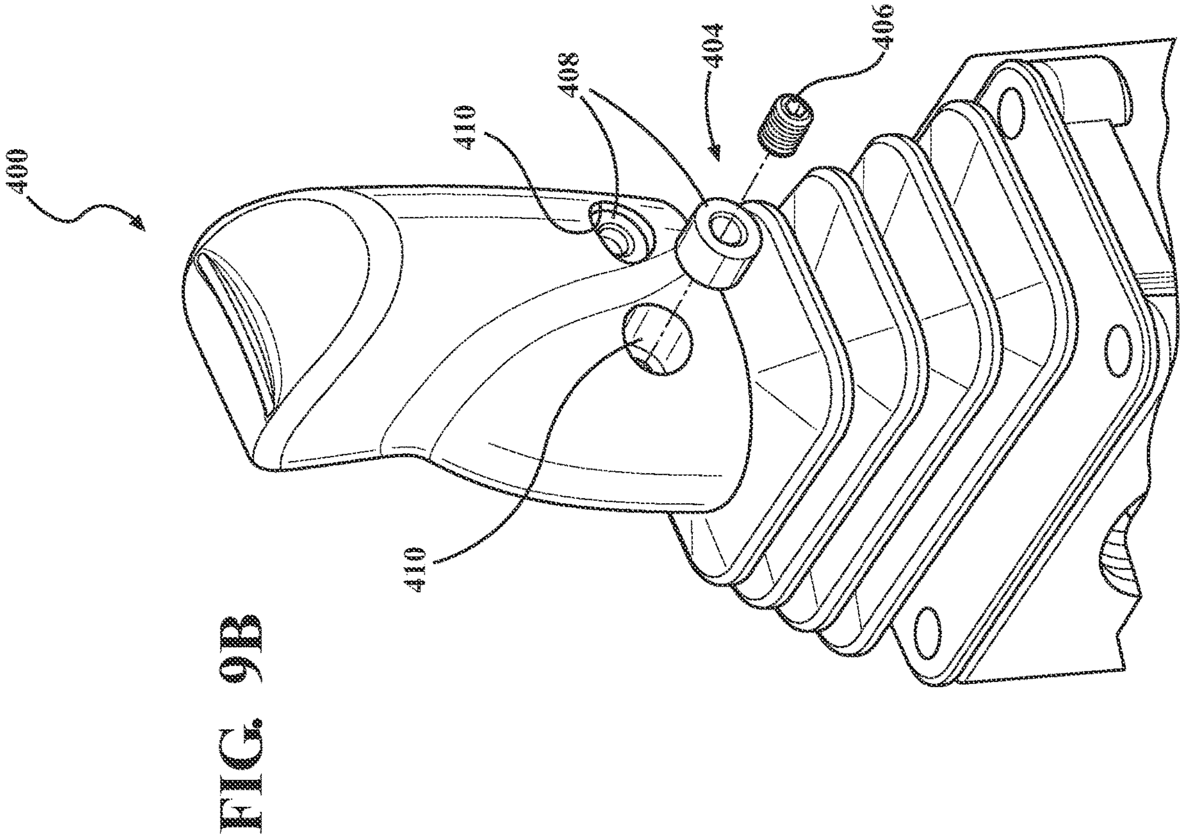
FIGS. 9A and 9B are cross sectional and perspective views showing an attachment of a control element to a mounting stem according to another aspect of the present invention.
Figure 9A:
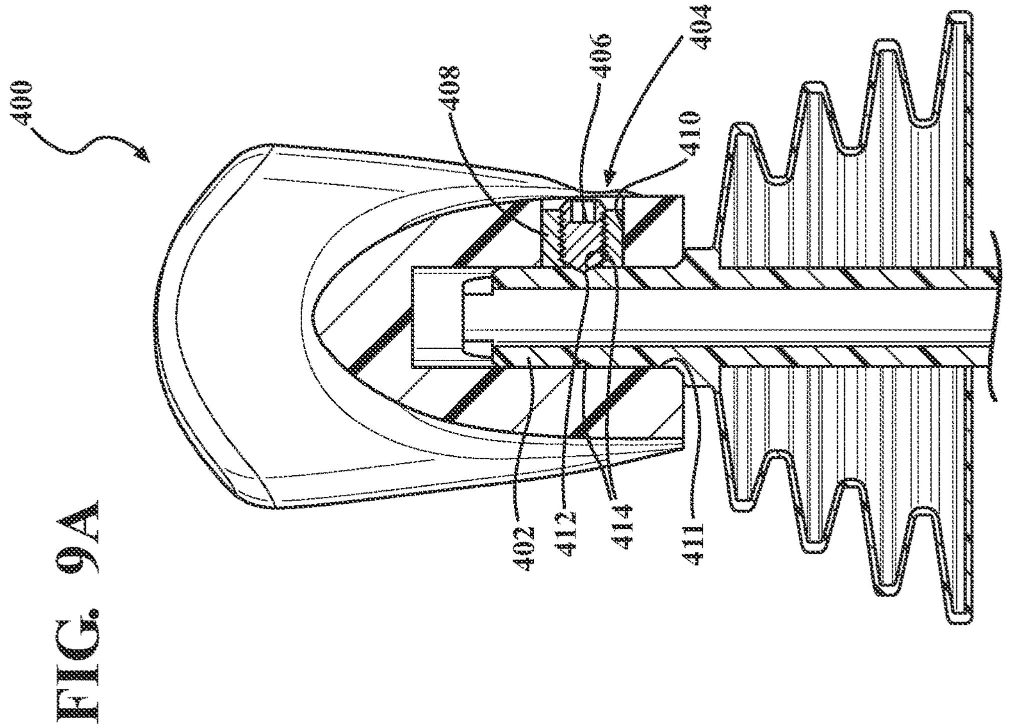

Referring now to FIGS. 9A and 9B, a control element 400 according to another aspect of the invention is shown. The control element 400 according to this embodiment is secured to a mounting stem 402 via an attachment assembly 404. The attachment assembly 404 may be used with any of the control elements described herein.

In the embodiment shown, the attachment assembly 404 comprises a set screw 406 that is threaded into an insert 408 affixed within an aperture 410 formed in the control element 400. The insert 408 may be formed from a material more rigid than the control element 400, e.g., brass or another metal or plastic, to provide a secure fixation of the set screw 406 to the insert 408. The insert 408 may be friction fitted, glued, melted, threaded, etc. within the aperture 410. The control element 400 shown includes two apertures 410 and corresponding inserts 408, the apertures 410 being orthogonal to and communicating with a respective one of one or more mounting holes 411 (only one mounting hole is shown in this embodiment) formed in the bottom of the control element 400 to allow for the control element 400 to be mounted in any one of the multiple positions as discussed in detail herein.

As shown in FIG. 9A, when the set screw 406 is fully installed into the insert 408 and with the control element 400 positioned over the mounting stem 402, a tip 412 of the set screw 406, which tip 412 is threaded in one embodiment but is not threaded in another embodiment, engages the mounting stem 402 or extends into a detent 414 or opening formed in the mounting stem 402. A second detent 414 is shown on the mounting stem 402 of FIG. 9A to receive the mounting structure 400 when in a different position. In one embodiment, the detent 414 is threaded to receive the threaded tip 412 of the set screw 406 but in another embodiment the pointed tip 412 of the set screw 406 tightly engages the mounting stem 402 to create a friction fit therebetween, wherein no detent in the mounting stem is required. The set screw 406 may be formed from a material more rigid than the mounting stem 402 such that the tip 412 of the set screw 406 may indent into the mounting stem 402 to further secure the control element 400 onto the mounting stem 402. In one embodiment, a washer (not shown) is provided to fit between the insert 408 and an enlarged head (not shown) of the set screw 406 to more tightly secure the control element 400 to the mounting stem 402.

The set screw 406 is removable in one embodiment to allow the control element 400 to be positioned in any of the one of the multiple positions as discussed in detail herein.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A control module for controlling at least one function of a materials handling vehicle comprising:
- a base portion; and
- a plurality of control elements extending from the base portion and located adjacent to one another in a lateral direction, the lateral direction defined between a first side of the base portion and a second side of the base portion, at least one of the control elements including:
  - a body portion comprising a bottom surface that faces the base portion, the body portion defined by a central portion and a shoulder portion extending in the lateral direction from a side of the central portion, wherein:
    - the shoulder portion provides the body portion with a non-uniform cross section at the bottom surface; and
    - a width of the central portion is greater than a width of the shoulder portion as measured in the lateral direction; and
  - a mounting structure that permits the control element to be selectively mounted to the base portion in at least first and second positions, the first position defining a first lateral distance between the control element and an immediately adjacent control element and the second position defining a second lateral distance between the control element and the immediately adjacent control element, the second lateral distance being greater than the first lateral distance, wherein the mounting structure of the at least one of the control elements comprises a mounting hole that extends from the bottom surface into the body portion, and wherein the mounting hole of the at least one of the control elements is at least partially located in the shoulder portion.

2. The control module of claim 1, wherein:
- the central portion of the at least one of the control elements defines a uniform cross section at the bottom surface; and
- the shoulder portion of the at least one of the control elements extends in the lateral direction from the central portion to provide the body portion with the non-uniform cross section at the bottom surface.

3. The control module of claim 2, wherein:
- the central portion of the at least one of the control elements defines a uniform circular or oval cross section at the bottom surface; and
- the shoulder portion of the at least one of the control elements defines an arched-shape cross section, extending from the circular or oval cross section defined by the central portion.

4. The control module of claim 1, wherein the at least one of the control elements further comprises an additional mounting hole extending from the bottom surface into the body portion, the mounting hole and the additional mounting hole being spaced apart from one another on the bottom surface of the body portion.

5. The control module of claim 4, wherein the at least one of the control elements is mountable in four positions by mounting the at least one control element in the respective mounting holes and by mounting the at least one control element with the shoulder portion facing opposite directions, and wherein each of the four positions results in a different lateral distance between the first one of the control elements and the immediately adjacent control element.

6. The control module of claim 4, wherein one of the mounting holes extends from the bottom surface at least partially into the shoulder portion and the other of the mounting holes extends from the bottom surface into the central portion and not into the shoulder portion.

7. The control module of claim 1, wherein the plurality of control elements comprises at least three control elements, and wherein actuation of the control elements by an operator controls a respective function of the materials handling vehicle.

8. The control module of claim 1, further comprising a locking structure that can be locked/unlocked by an operator to lock/unlock the control elements in place on the vehicle.

9. The control module of claim 1, wherein the first side of the base portion is located proximate to an operator working position defined within an operator's compartment of the vehicle, and the second side of the base portion is located distal from the operator working position.

10. The control module of claim 1, wherein:
- the shoulder portion of the at least one of the control elements defines a first lateral edge of the body portion; and the central portion of the at least one of the control elements defines a second lateral edge of the body portion, the second lateral edge opposed from the first lateral edge.

11. A control element for controlling at least one function of a materials handling vehicle comprising:

a body portion having a bottom surface, a central portion, and a shoulder portion extending from a side of the central portion; and a mounting structure comprising first and second mounting holes that are identical to one another, each of the first and second mounting holes extending into the body portion from the bottom surface, the mounting holes being spaced apart from one another on the bottom surface and each being provided for selectively receiving a same mounting stem of the vehicle to mount the control element in the vehicle, wherein the control element is mountable in four positions by mounting the control element in the respective first and second mounting holes and by mounting the control element with the shoulder portion facing opposite directions, and wherein each of the four positions results in a different lateral distance between the control element and an immediately adjacent control element.

12. The control element of claim 10, wherein the first and second mounting holes are both offset from a center point of the bottom surface of the body portion.

13. The control element of claim 10, wherein the shoulder portion provides the body portion with a non-uniform cross section, and at least one of the first and second mounting holes is at least partially located in the shoulder portion.

14. A control module for controlling at least one function of a materials handling vehicle comprising:

a base portion; and a plurality of control elements extending from the base portion and located adjacent to one another in a lateral direction, the lateral direction defined between a first side of the base portion and a second side of the base portion, wherein:

a first one of the control elements comprises:

a body portion including a bottom surface that faces the base portion, the body portion defined by a central portion and a shoulder portion extending in the lateral direction from a side of the central portion, wherein:

the shoulder portion provides the body portion of the first one of the control elements with a nonuniform cross section at the bottom surface; and a width of the central portion is greater than a width of the shoulder portion as measured in the lateral direction; and a mounting structure that permits the first one of the control elements to be mounted to the base portion in a first position wherein the shoulder portion faces a first direction, wherein the mounting structure of the first one of the control elements comprises a mounting hole that extends from the bottom surface of the first one of the control elements into the body portion of the first one of the control elements, and the mounting hole of the first one of the control elements is at least partially located in the shoulder portion of the first one of the control elements; and a second one of the control elements comprises:

a body portion including a bottom surface that faces the base portion, the body portion defined by a central portion and a shoulder portion extending in the lateral direction from a side of the central portion, wherein the shoulder portion provides the body portion of the first one of the control elements with a nonuniform cross section at the bottom surface; and a mounting structure that permits the second one of the control elements to be mounted to the base portion in a second position wherein the shoulder portion faces a second direction different than the first direction, the first position defining a first distance between the first one of the control elements and an immediately adjacent control element and the second position defining a second distance between the second one of the control elements and the immediately adjacent control element, the second distance being greater than the first distance, wherein the mounting structure of the second one of the control elements comprises a mounting hole that extends from the bottom surface of the second one of the control elements into the body portion of the second one of the control elements, and the mounting hole of the second one of the control elements is at least partially located in the shoulder portion of the second one of the control elements.

15. The control module of claim 14, wherein:

the mounting hole of the first one of the control elements is offset from a center point of the bottom surface of the first one of the control elements.

16. The control module of claim 15, wherein:

the first one of the control elements further comprises an additional mounting hole extending from the bottom surface into the body portion of the first one of the control elements, the two mounting holes being spaced apart from one another on the bottom surface of the body portion;

the first one of the control elements is mountable in four positions by mounting the first one of the control elements in the respective mounting holes and by mounting the first one of the control elements with the shoulder portion facing opposite directions; and each of the four positions results in a different first distance between the first one of the control elements and the immediately adjacent control element.

17. The control module of claim 14, further comprising a locking structure that can be locked/unlocked by an operator to lock/unlock the control elements in place on the vehicle.

18. The control module of claim 14, wherein the first side of the base portion is located proximate to an operator working position defined within an operator's compartment of the vehicle, and the second side of the base portion is located distal from the operator working position.

19. The control module of claim 14, wherein:

the shoulder portion of the first one of the control elements defines a first lateral edge of the body portion; and the central portion of the first one of the control elements defines a second lateral edge of the body portion, the second lateral edge opposed from the first lateral edge.

* * * * *